(12) United States Patent
Herrmann et al.

(10) Patent No.: US 8,511,174 B2
(45) Date of Patent: Aug. 20, 2013

(54) STRAIN SENSOR AND CORRESPONDING SENSOR ARRANGEMENT

(75) Inventors: Wolfram Herrmann, Wunstrof (DE);
Frank Jungrichter, Korbach (DE);
Stefan Sostmann, Langenhagen (DE);
Dieter Borvitz, Hannover (DE);
Hubertus Gawinski, Lauenau (DE);
Siegfried Reck, Nienburg (DE)

(73) Assignee: ContiTech AG, Hannover (DE)

( * ) Notice: Subject to any disclaimer, the term of this patent is extended or adjusted under 35 U.S.C. 154(b) by 666 days.

(21) Appl. No.: 12/655,497

(22) Filed: Dec. 31, 2009

(65) Prior Publication Data

US 2010/0139413 A1    Jun. 10, 2010

Related U.S. Application Data

(63) Continuation of application No. PCT/EP2008/057833, filed on Jun. 20, 2008.

(30) Foreign Application Priority Data

Jul. 2, 2007  (DE) .......................... 10 2007 030 680

(51) Int. Cl.
*G01L 1/00* (2006.01)
*G01L 1/10* (2006.01)

(52) U.S. Cl.
USPC ..... 73/774; 73/777; 73/862.381; 73/862.621; 73/862.625

(58) Field of Classification Search
USPC ................. 73/760, 763, 767, 768, 769, 773, 73/774, 775, 777, 862.381, 862.621, 862.625, 73/862.627
See application file for complete search history.

(56) References Cited

U.S. PATENT DOCUMENTS

| | | | | | |
|---|---|---|---|---|---|
| 3,748,623 | A | * | 7/1973 | Millar | ................................. 338/4 |
| 4,715,235 | A | * | 12/1987 | Fukui et al. | ................. 73/862.68 |
| 5,051,034 | A | | 9/1991 | Goodman | |
| 5,425,275 | A | * | 6/1995 | Lockshaw | ....................... 73/775 |

(Continued)

FOREIGN PATENT DOCUMENTS

| | | |
|---|---|---|
| DE | 196 20 582 | 11/1997 |
| DE | 100 04 632 | 8/2000 |

(Continued)

OTHER PUBLICATIONS

Olah et al. "Application of Ferrite-Rubbers as Sensors" Journal of Electrical Engineering, vol. 57, No. 8/S, pp. 147-150. 2006. <http://iris.elf.stuba.sk/JEEEC/data/pdf/8s_106-36.pdf>.*

(Continued)

*Primary Examiner* — Lisa Caputo
*Assistant Examiner* — Jonathan Dunlap
(74) *Attorney, Agent, or Firm* — Collard & Roe, P.C.

(57) ABSTRACT

The invention relates to a sensor as a built-in component of an object, especially an elastic object, the sensor comprising a polymer material containing electroconductive additives according to the invention and thereby acting as an expansion sensor (2), in that it measures the static and dynamic expansions of the object in relation to the acting forces and also monitors the changes of the polymer material generated by the static and dynamic expansions of the object over time. The invention also relates to a sensor arrangement (1) acting especially in combination with the following components: an expansion sensor (2), a fixed resistor (3), an analog/digital converter (4), a micro-controller comprising a memory (5), a radio interface (6), a controlled current/voltage source (7), an energy supply (8), a coupling coil (9), and a receiving unit (10).

58 Claims, 2 Drawing Sheets

(56) References Cited

U.S. PATENT DOCUMENTS

| | | | |
|---|---|---|---|
| 5,505,093 A * | 4/1996 | Giedd et al. | 73/774 |
| 5,797,623 A * | 8/1998 | Hubbard | 280/735 |
| 5,802,030 A | 9/1998 | Hiramatsu | |
| 6,006,831 A * | 12/1999 | Schlemmer et al. | 166/250.01 |
| 6,079,277 A * | 6/2000 | Chung | 73/774 |
| 6,163,256 A * | 12/2000 | Brown | 340/479 |
| 6,291,991 B1 | 9/2001 | Schnell | |
| 6,774,162 B1 | 8/2004 | Vortkort et al. | |
| 6,789,735 B1 | 9/2004 | Schnell | |
| 7,256,505 B2 * | 8/2007 | Arms et al. | 290/1 R |
| 7,259,854 B2 | 8/2007 | Schnell | |
| 7,338,648 B2 | 3/2008 | Harutyunyan et al. | |
| 7,434,475 B2 * | 10/2008 | Mainwaring et al. | 73/777 |
| 7,849,751 B2 * | 12/2010 | Clark et al. | 73/768 |
| 2002/0092364 A1 * | 7/2002 | Adderton et al. | 73/862.41 |
| 2004/0244495 A1 * | 12/2004 | Weber et al. | 73/775 |
| 2005/0017602 A1 * | 1/2005 | Arms et al. | 310/339 |
| 2005/0019180 A1 * | 1/2005 | Seto et al. | 417/413.1 |
| 2005/0142435 A1 * | 6/2005 | Dristy et al. | 429/66 |
| 2005/0151353 A1 * | 7/2005 | Kumagai | 280/731 |
| 2006/0032314 A1 * | 2/2006 | Hnat et al. | 73/795 |
| 2006/0184067 A1 | 8/2006 | Clark et al. | |
| 2007/0084293 A1 * | 4/2007 | Kaiserman et al. | 73/763 |
| 2007/0214895 A1 * | 9/2007 | Mainwaring et al. | 73/760 |
| 2008/0006513 A1 * | 1/2008 | Stolyar et al. | 198/810.01 |
| 2009/0215953 A1 * | 8/2009 | Hwang et al. | 524/496 |

FOREIGN PATENT DOCUMENTS

| | | |
|---|---|---|
| DE | 100 25 504 | 1/2002 |
| EP | 1 053 447 | 11/2000 |
| EP | 1 660 393 | 5/2006 |
| WO | WO 00/65533 | 11/2000 |
| WO | WO 03/076953 | 9/2003 |
| WO | WO 2007/109896 | 10/2007 |

OTHER PUBLICATIONS

Zhang et al. "Dynamically Vulcanized Nitrile Rubber/Polypropylene Thermoplastic Elastomers" Journal of Applied Science, vol. 85, Issue 14, pp. 2862-2866. Jul. 17, 2002. <http://onlinelibrary.wiley.com/doi/10.1002/app.10884/pdf>.*

Huang et al. "The EMI shielding effectiveness of PC/ABS/nickel-coated-carbon-fibre composites" European Polymer Journal, vol. 36, Issue 12, pp. 2729-2737. Oct. 6, 2000. <http://www.sciencedirect.com/science/article/pii/S0014305700000392>.*

Cochrane et al. "Design and Development of a Flexible Strain Sensor for Textile Structures Based on a Conductive Polymer Composite" Sensors 2007, Issue 7, pp. 473-492. Apr. 18, 2007. <http://citeseerx.ist.psu.edu/viewdoc/summary?doi=10.1.1.109.8004>.*

Chiang et al. "Effect of surface treatment of carbon fiber on the electrical and mechanical properties of high-impact polystyrene composite" Journal of Polymer Science, vol. 2, Issue 2, pp. 83-89. Apr. 1995. <http://www.springerlink.com/content/I645754157372284/>.*

Oya et al. "Direct measurement of longitudinal compressive strength in carbon fibres" Carbon, vol. 37, Issue 10, pp. 1539-1544. Aug. 25, 1999. <http://www.sciencedirect.com/science/article/pii/S0008622399000330>.*

Sau et al. "Electrical and mechanical properties of conducting carbon black filled composites based on rubber and rubber blends" Journal of Applied Polymer Science, vol. 71, Issue 6, pp. 887-895. Feb. 7, 1999. <http://onlinelibrary.wiley.com/doi/10.1002/(SICI)1097-4628(19990207)71:6%3C887::AID-APP4%3E3.0.CO;2-D/abstract>.*

Pramanik et al. "Effect of extensional strain on the resistivity of electrically conductive nitrile-rubber composites filled with carbon filler" Journal of Materials Science, vol. 28, No. 13, pp. 3539-3546. 1993. <http://www.springerlink.com/content/k92061631q85t780/>.*

International Search Report.
DIN 53505, Aug. 2000. (Spec, pp. 8-9 and 11).
DIN 53504, May 1994. (Spec, pp. 8-9 and 11).
DIN IEC 93, Dec. 1993. (Spec, pp. 8-9 and 11).
DIN EN ISO 7854, Apr. 1997. (Spec, p. 10).
ISO 132, Fourth Edition, Oct. 15, 2005. (Spec, p. 10).

* cited by examiner

STRAIN SENSOR AND CORRESPONDING SENSOR ARRANGEMENT

CROSS REFERENCE TO RELATED APPLICATIONS

Applicants claim priority under 35 U.S.C. §119 of German Application No. 10 2007 030 680.8 filed Jul. 2, 2007. Applicants also claim priority and this application is a continuation under 35 U.S.C. §120 of International Application No. PCT/EP2008/057833 filed Jun. 20, 2008, which claims priority under 35 U.S.C. §119 of German Application No. 10 2007 030 680.8 filed Jul. 2, 2007. The international application under PCT article 21(2) was not published in English.

BACKGROUND OF THE INVENTION

1. Field of the Invention

The invention relates to a sensor as integrated component of an article, in particular an elastic article, where the sensor comprises a polymeric material.

2. Prior Art

A sensor of the abovementioned type is known from WO 00/65533 A1. Detectable material particles are embedded in a matrix, in particular a matrix composed of plastic, rubber or rubber-like material. These material particles are, in particular, metal pieces, permanent magnets or polymer particles. Magnetizable material, in particular ferrite material, can also be mixed into the matrix. This matrix is, in particular, in strip form. This sensor matrix is part of a device for coding, i.e. identification and addressing, and also for marking of articles and is employed, in particular, for the following elastic articles:
  conveyor belts (EP 1 053 447 B1, EP 1 660 393 B1)
  hoses (U.S. Pat. No. 5,051,034)
  tires (DE 196 20 582 A1)

With regard to the devices using sensors, reference is made, in particular, to the following documents: DE 100 25 504 C1, WO 03/076953 A2, WO 2007/109896 A1 and U.S. Pat. No. 5,802,030.

SUMMARY OF THE INVENTION

In the context of a further development, it is an object to provide a sensor which firstly retains the standard properties of a polymeric material and secondly is sensitive to strain changes and excitation frequencies to measure the loading state of an article in order to be able to recognize overloading or predict failure during operation.

This object is achieved by the polymeric material being provided with electrically conductive additives and acting as strain sensor by measuring static and dynamic strain in the article in relation to the forces acting on the article and in addition monitoring the changes in the polymeric material over time resulting from the static and dynamic strain in the article.

As regards the polymeric material which can be provided with electrically conductive additives, the following variants in particular are used:

Variant A

The polymeric material is an elastomeric material based on a vulcanized rubber mixture which comprises an unblended rubber component or a rubber component blend, electrically conductive additives and customary mixture ingredients. As rubber components, particular mention may be made of:
ethylene-propylene copolymer (EPM)
ethylene-propylene-diene copolymer (EPDM)
nitrile rubber (NBR)
(partially) hydrogenated nitrile rubber (HNBR)
fluoro rubber (FR)
chloroprene rubber (CR)
natural rubber (NR)
styrene-butadiene rubber (SBR)
isoprene rubber (IR)
butyl rubber (IIR)
bromobutyl rubber (BIIR)
chlorobutyl rubber (CIIR)
butadiene rubber (BR)
chlorinated polyethylene (CM)
chlorosulfonated polyethylene (CSM)
polyepichlorohydrin (ECO)
ethylene-vinyl acetate rubber (ACM)
silicone rubber (MVQ)
fluorinated methylsilicone rubber (FFPM)
perfluorocarbon rubber (FFCR)
polyurethane (PU)

The use of a blend, in particular in combination with one of the abovementioned types of rubber, is also possible.

EPM, EPDM, HNBR, CR, NR, FR or a blend of NR and BR are of particular importance.

The electrically conductive additives are present in an amount of from 3 to 100 phr (parts per hundred of rubber), associated with the following differentiation:
  If the electrically conductive additives have a conductivity in the range from $10^2$ to $10^6$ S/cm, from 3 to 50 phr, in particular from 3 to 30 phr, are sufficient.
  If the electrically conductive additives have a conductivity in the range from $10^{-1}$ to $10^2$ S/cm, an amount of from 20 to 80 phr is advantageous.

The customary mixture ingredients comprise at least one crosslinker or a crosslinker system (crosslinker and accelerator). Further mixture ingredients are usually a processing aid and/or a plasticizer and/or an aging inhibitor and if appropriate further additives. In this respect, reference may be made to general knowledge in rubber mixture technology.

Variant B

The polymeric material is a thermoplastic elastomer (TPE) which is provided with the electrically conductive additives and comprises customary mixture ingredients (DE 100 04 632 A1).

Thermoplastic elastomers employed are, in particular, thermoplastic elastomers based on styrene (TPE-S), uncrosslinked or partially crosslinked olefin-based thermoplastic elastomers (TPE-O) or fully crosslinked olefin-based thermoplastic elastomers (TPE-V). A blend of a thermoplastic polymer and an at least partially crosslinked rubber (e.g. EPDM) is also possible.

The electrically conductive additives are present in an amount of from 0.5 to 20% by weight, in particular from 1 to 15% by weight, more particularly from 1 to 10% by weight. Amounts of from 1 to 3% by weight are usually sufficient.

Variant C

The polymeric material is a polymer which is provided with the electrically conductive additives.

Use is here made of, in particular, a fluorine-containing polymer, in particular polytetrafluoroethylene (PTFE), polyvinyl fluoride (PVF), polyvinylidene fluoride (PVDF) or chemical modifications thereof.

As regards the proportion of electrically conductive additives, what has been said in the case of variant B also applies here.

Regardless of the abovementioned polymeric material variants, the polymeric strain sensor is characterized by a filler concept based on electrically conductive additives.

These are, in particular, metals and/or metal compounds and/or carbon black and/or carbon fibers and/or graphite and/or nanotubes and/or ionic liquids. These materials are suitable for influencing a dielectric in a targeted manner and optimizing it for the measurement principle which represents the actual basis of the measurement.

The filler-filler interactions are reduced by strain as a function of the dynamic stress (amplitude, frequency, time) and only partly recombine after interruption of the mechanical stress. The material therefore acts as a strain-dependent (variable) resistance. The change in the material can be monitored over the number of loading cycles as a result of the only partial recombination of the filler-filler interaction. In addition, the relaxation time after mechanical deformation has been stopped is greatly dependent on the preceding deformation amplitude. The combination of these two effects opens up the possibility of constructing a strain sensor which measures the mechanical stress and aging state of polymers.

Advantageous specifications of electrically conductive additives are given below:

The metals are present as metal powder and/or as metal fibers. In the case of metal fibers in the form of short fibers, the fiber length is, in particular, from 1 to 6 mm.

When metal compounds, for example metal salts, for example, iron chloride ($FeCl_3$), or metal oxides, for example indium-doped zinc oxide (ITO), are used, the powder form is most important.

The electrically conductive additives are carbon black and/or carbon fibers. The carbon black is a conductive carbon black and/or standard carbon black. In the case of carbon fibers, the fiber length is from 50 to 150 μm. When carbon fibers are used, short fibers having a fiber length of from 3 to 6 mm are also possible.

The nanotubes comprise carbon (U.S. Pat. No. 7,338,648 B2) and are referred to as CNTs for short. Nanotubes are tubes having a layer structure and a diameter of a few nanometers.

When ionic liquids comprising a cationic part and an anionic part are used, use is made of, for example:

| | |
|---|---|
| cations: | dialkylimidazolium, alkylpyridinium, tetraalkylammonium, tetraalkylphosphonium |
| anions: | chloride, bromide, tetrafluoroborate, tetrachloroferrate(III), hexafluorophosphate, alkylsulfonate |

The electrically conductive additives comprise a polymer, a polymer blend or a polymer mixture having electrically conductive functional groups, in particular carbonyl groups, more particularly ester groups. Use is made here of, in particular, a polyethylene glycol ester and/or a polyethylene glycol carboxylic ester.

The use of conductive carbon blacks has been found to be particularly advantageous compared to other solutions since the filler network formed therefrom is able to conduct adequate currents and react very sensitively to strain changes. In addition, when they replace standard carbon blacks in polymer formulations, in particular in rubber mixture formulations, they lead to barely any significant changes in the physical properties.

If carbon fibers are used in addition to a conductive carbon black, the change in the conductivity can be optimized further. The relaxation times are significantly shortened so that rapid dynamic deformations are also readily measured. In addition, this combination reduces the decrease in the conductivity with increasing deformation amplitude, so that relatively large deformation displacements can be measured more easily.

The electrically conductive additives are uniformly distributed within the polymeric material. Furthermore, they can be additionally coated with a low molecular weight compound. They are in this case coated with, in particular, a wax and/or a fat and/or an oil and/or stearic acid and/or an aging inhibitor and/or a short-chain polymer.

The polymeric materials obtained by means of the conductive additives can in terms of their conductivity be classified into:

readily conductive materials having a conductivity in the range form $10^0$ to $10^2$ S/cm (e.g. polymeric materials filled with metal fibers);

moderately conductive materials having a conductivity in the range from $10^{-3}$ to $10^0$ S/cm (e.g. conductive carbon black compounds);

materials provided with antistatics and having a conductivity in the range from $10^{-6}$ to $10^{-3}$ S/cm.

The moderately to readily conductive materials are suitable for conductivity measurements independently of the frequency (DC conductivity and dielectric properties). The moderately conductive to antistatic materials, on the other hand, are preferably suitable for characterization at relatively high frequencies (dielectric properties).

Three mixture examples based on material variant A are given below.

MIXTURE EXAMPLE 1

A rubber mixture based on 100 phr of sulfur-modified chloroprene rubber contains conductive additives in a total amount of 30 phr, namely:

25 phr of conductive carbon black (obtainable, for example, under the trade name Ensaco™ 260G from Timcal or Katchen Black EC from Akzo Nobel; BET surface area greater than 120 $m^2/g$; DBP adsorption greater than 90 $cm^3/100$ g) and 5 phr of carbon fibers (obtainable, for example, under the trade name Tenax™ A383 having a fiber length of from 50 to 150 μm from Toho Tenax Europe GmbH or from SGL Carbon Group in the form of short fibers having a fiber length of from 3 to 6 mm).

This rubber was crosslinked with the customary mixture ingredients (e.g. waxes, aging inhibitors) with the aid of metal oxides (mixture of MgO and ZnO). This gives a vulcanizate having a hardness of 65 Shore A (in accordance with DIN 53505) and an elongation at break of 750% (in accordance with DIN 53504). The electrical volume resistance in accordance with DIN IEC 93 is 13 Ω.

If the DC conductivity of this material at a potential of 10 volt is measured on a strip having dimensions of 50×12×2 mm (length×width×thickness), the following behavior as a function of the elongation is observed:

80 kΩ at 0% elongation; 20 kΩ at 10% elongation; 200 kΩ at 20% elongation; 300 kΩ at 35% elongation; 550 kΩ at 50% elongation; 1.1 MΩ at 75% elongation; 2.0 MΩ at 100% elongation.

After releasing the stress, the conductivity returns to virtually the initial level in a very short time. This property profile makes the material very well suited as sensor material for monitoring very fast dynamic deformations, for example as load cycle counter.

MIXTURE EXAMPLE 2

A rubber mixture based on a blend of 40 phr of natural rubber and 60 phr of butadiene rubber contains 65 phr of a standard carbon black as conductive additive, namely:

a carbon black having a CTAB surface area of 42 m²/g and a DBP adsorption of 121 ml/100 g, for example N550.

This rubber blend was crosslinked with the customary mixture ingredients (e.g. waxes, aging inhibitors) by means of sulfur (sulfenamide-accelerated and ZnO-activated). This gives a vulcanizate having a hardness of 60 Shore A (in accordance with DIN 53505) and an elongation at break of 500% (in accordance with DIN 53504). The electrical volume resistance in accordance with DIN IEC 93 is 1.2 lΩ.

If the polarizability of this material is measured in AC conductivity measurements at 200 kHz, the following results are obtained as a function of the degree of fatigue of the material:

Real part of the relative permittivity ($\epsilon_r'$), measured on a specimen geometry of 5 mm diameter and 2 mm thickness, applied potential 500 mV, frequency 200 kHz, measuring instrument Agilent 4294A Precision Impedance Analyzer:

| | |
|---|---|
| ($\epsilon_r'$) = | 0.32 on fresh specimen |
| ($\epsilon_r'$) = | 0.045 after ⅓ of the maximum number of dynamic load cycles |
| ($\epsilon_r'$) = | 0.032 after ⅔ of the maximum number of dynamic load cycles |
| ($\epsilon_r'$) = | 0.023 after ⅗ of the maximum number of dynamic load cycles |

The dynamic fatigue test was carried out by a method based on DIN EN ISO 7854 on a flexural testing machine in accordance with ISO 132 (test specimen: 120×40 mm, bending frequency 5.0 Hz). The maximum number of load cycles is determined by the occurrence of cracks and the associated destruction of the test specimen. In this example it was 5 million bending cycles.

The sensitive monitoring of the dielectric property over a very long time under stress makes this example particularly suitable as sensor material for monitoring long-term fatigue. The state of fatigue of the material and the expected failure can be predicted reliably in this way, for example during operation. In addition, this material can also be utilized for monitoring the number of load cycles.

MIXTURE EXAMPLE 3

A rubber mixture based on 100 phr of natural rubber contains conductive additives in a total amount of 25 phr, namely:
- 15 phr of conductive carbon black (obtainable, for example, under the trade name Ensaco™ 260G from Timcal or Katchen Black EC from Akzo Nobel; BET surface area greater than 120 m²/g; DBP adsorption greater than 90 cm³/100 g) and
- 10 phr of nanotubes (obtainable, for example, under the trade name NC-7000 from Nanocyl, Belgium).

This rubber was crosslinked with the customary mixture ingredients (e.g. waxes, aging inhibitors) by means of sulfur (sulfenamide-accelerated and ZnO-activated). This gives a vulcanizate having a hardness of 67 Shore A (in accordance with DIN 53505) and an elongation at break of 400% (in accordance with DIN 53504). The electrical volume resistance in accordance with DIN IEC 93 is 3.6 Ω.

This material is characterized by extremely good DC conductivity combined with a high AC conductivity. In addition, the dielectric properties over a frequency range from 100 Hz to 500 kHz in the elongation range up to 200% have been found to be independent of frequency and elongation (i.e. constant).

These properties make the material particularly suitable as an electrode material for dynamic and especially dielectric measurements during dynamic loading of the elastomer product.

The novel sensor concept presented here has the advantage, as shown in the examples, that the sensor material can in each case be matched very specifically to the application, for example in respect of hardness, conductivity and polymer system.

Another significant advantage is that a strain sensor based on elastomers makes it possible for it to be joined to the article directly during vulcanization, so that no additional defects or adhesive bonds occur.

In addition, it is found that polymeric conductors can also be used as contacts, as shown in mixture example 3, for example by elastomers filled with from 3 to 10 phr of carbon nanotubes. These conductors can likewise be embedded in the article without defects during vulcanization. Instead of a polymeric conductor, reinforcing materials which have good conductivity (e.g. with metal filaments incorporated in, the woven fabric) can also be used as contacts.

The polymeric strain sensor can be a component of:
- a hose (motor vehicle hose, floating hose, etc.);
- a pneumatic spring bellows (axial bellows, crossply bellows) or compensator;
- a drive belt (flat belt, V-belt, V-ribbed belt, toothed belt);
- a conveyor belt (textile belt, steel rope belt) and a conveyor belt connection;
- a tire;
- a material, in particular a container material;
- an item of interior trim, in particular an airbag system.

Apart from the use as strain sensor for monitoring the stress state and the stress history of an article, applications in overload controls, controls for the tightening torque of fastener/screw connections and pressure-sensitive "switching" (for example in optical controls or musical keyboard instruments) are also possible.

Finally, the abovementioned strain sensor in all its material variants is a component of a sensor arrangement, in particular as part of the following component combinations:
- The strain sensor together with a microcontroller forms a total sensor. The microcontroller is additionally provided with a memory.
- The sensor arrangement is provided with a fixed resistance.
- The sensor arrangement is equipped with an analog/digital converter.
- The sensor arrangement has a radio interface.
- The sensor arrangement is provided with a current/potential source which is controlled.
- The sensor arrangement is equipped with an energy supply which in turn comprises a rectifier and an energy store. The energy supply is effected electrically, via field coupling or by means of a dedicated piezoelectric generator unit.
- The sensor arrangement is provided with a coupling coil which operates at typical ISM frequencies, in particular 125 kHz.
- The sensor arrangement is provided with a receiver, in particular in the form of a radio antenna.
- Finally, the sensor arrangement is provided with a data processing unit.

In connection with the figure description 2, this sensor arrangement will be described in more detail.

BRIEF DESCRIPTION OF THE DRAWINGS

The invention will now be illustrated with the aid of examples with reference to schematic drawings. In the drawings.

DETAILED DESCRIPTION OF THE PREFERRED EMBODIMENTS

Figure 1:
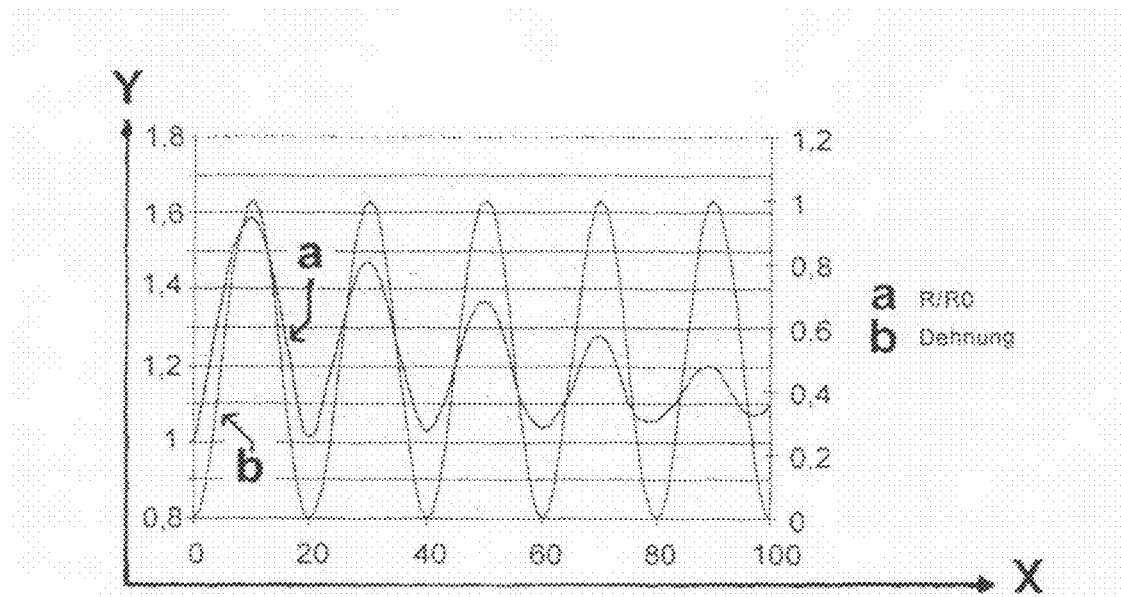
FIG. 1 shows a sketch of a resistance-elongation curve.

The sketch of the resistance-elongation curve of FIG. 1 with the ordinate Y (resistance) and the abscissa X (loading cycles) is associated with the following situation:

The elongation of an elastic component, for example a pneumatic spring bellows, breaks the filler-filler interaction which, after interruption of the mechanical stress, recombines only partially. In this way, the material acts as strain-dependent (variable) resistance. The only partial recombination of the filler-filler interaction enables the change in the material over the number of load cycles to be monitored. In addition, the relaxation time after the mechanical deformation is released is strongly dependent on the preceding deformation amplitude. The combination of these two effects makes it possible to construct a strain sensor which measures the mechanical loading and aging states of polymers. This situation is schematically shown here with the aid of the two curves a (R/R0) and b (elongation) in FIG. 1.

Figure 2:
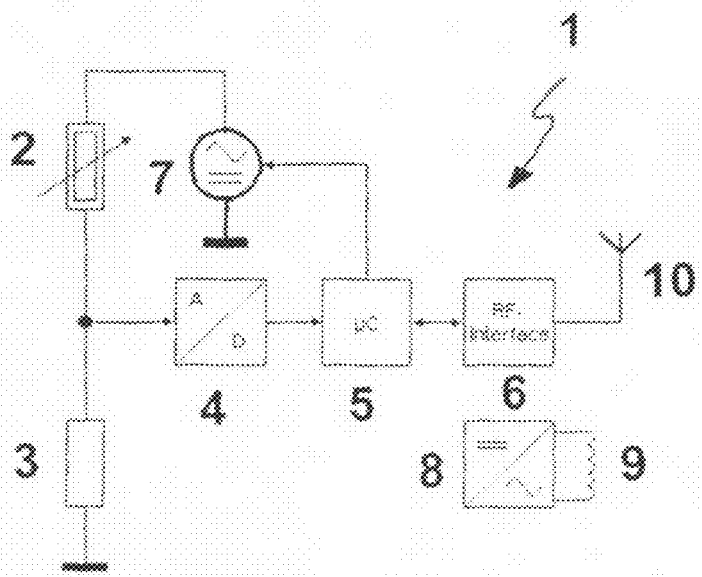
FIG. 2 shows a sensor arrangement using a strain sensor.

FIG. 2 shows an advantageous sensor arrangement 1 using the strain sensor 2 according to the invention.

In a preferred embodiment, the polymeric strain sensor 2 is in the form of a strip. The strip is contacted in a suitable way, for example by means of a polymeric conductor having mixed-in carbon nanotubes, and connected in series with a fixed resistance 3. This series arrangement is provided with current from a controlled current/potential source 7.

In favorable cases, the elastomeric material of the article can itself also be modified so that it can be utilized directly as sensor material.

The strain-dependent resistance modulates the current, as a result of which a variable potential which is proportional to the resistance change in the strain sensor 2 and thus also proportional to the elongation of the strain sensor is obtained over the fixed resistance 3. In view of the only partial recombination of the filler-filler network, a memory for the most recently achieved measured values is advantageous (level memory). The evaluation of the electric signal is carried out by a microcontroller 5 having an analog/digital converter 4 and an integrated memory. The measured data can be transmitted electrically or alternatively by radio or via field coupling to the data processing unit.

The controlled current/potential source 7 makes it possible to generate even complex excitation signals, for example high-frequency AC potentials, in order to be able to monitor the relaxation behavior and/or the dielectric properties.

The energy supply 8 to the total sensor comprising strain sensor 2 and microcontroller 5 is effected either electrically, via field coupling or by means of a dedicated piezoelectric generator unit.

A further advantageous possibility is provision of an additional comparative sensor, for example in the form of a sensor strip, outside the dynamically stressed region which allows continual comparison between stressed and unstressed specimen. This can serve to allow for temperature effects caused by the dynamic load and feed them into the data processing unit.

Purely static aging of the material also leads to a change in the polymer-filler and filler-filler interaction. The comparative sensor enables these effects, too, to be taken into account. In addition, the proposed arrangement can also be utilized for measuring static aging.

As a result of the strain-dependent resistance changes of the sensor material and their relaxation being temperature dependent, the strain sensor 2 can in principle also be utilized for temperature measurement.

Figure 3:
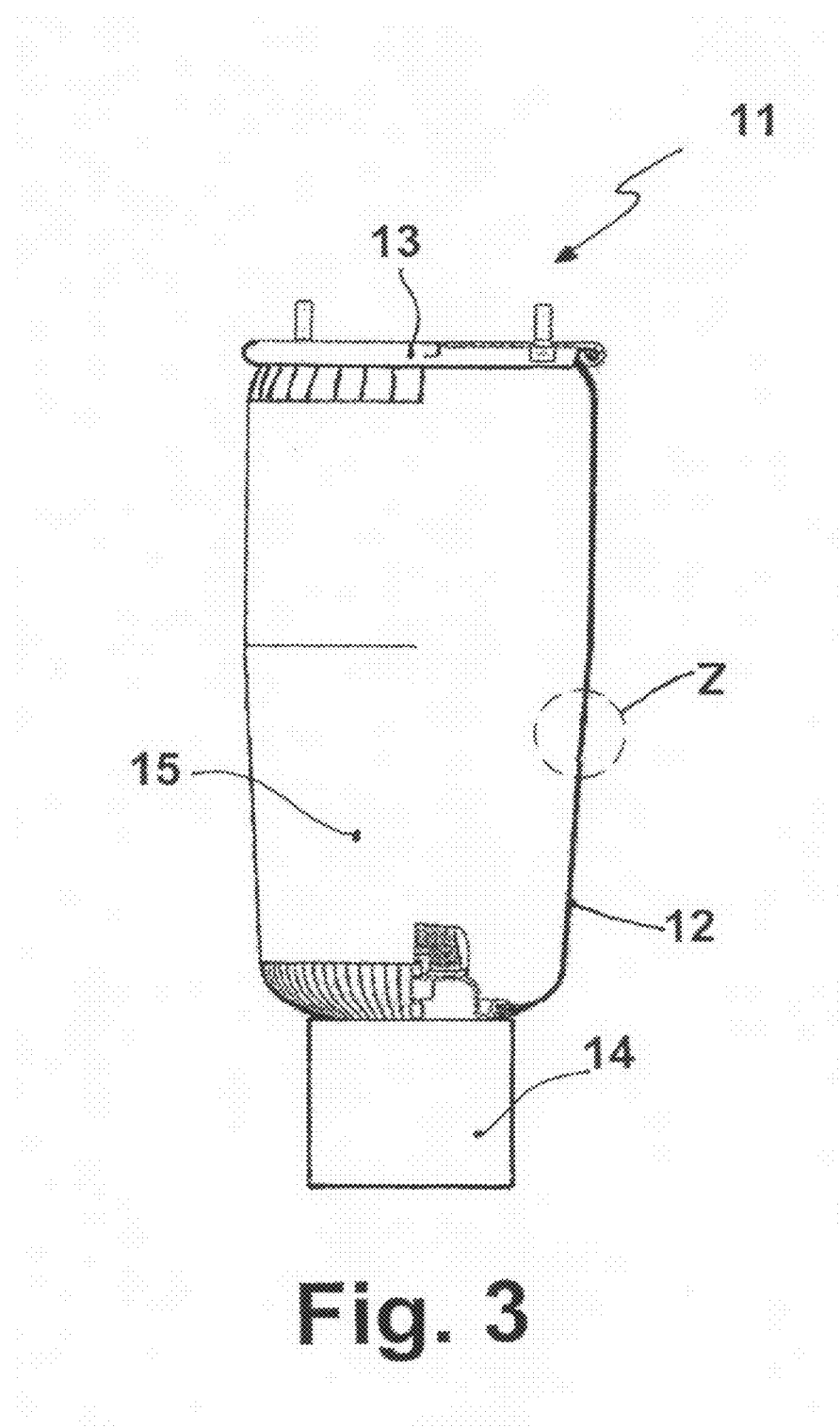
FIG. 3 shows a pneumatic spring arrangement.

FIG. 3 shows a pneumatic spring arrangement 11 comprising a pneumatic spring bellows 12 and the two end components lid 13 and rolling piston 14 to form a volume-elastic air chamber 15. The pneumatic spring bellows is made of a polymeric material having elastic properties and is provided, in particular, with an embedded reinforcing material. As regards detail, reference may be made to general knowledge in the field of pneumatic spring technology.

In one variant, the total polymeric material of the pneumatic spring bellows 12 can be provided with electrically conductive additives so that the total pneumatic spring bellows forms the strain sensor.

In a further variant, the polymeric material of the article can be provided with electrically conductive additives in at least one segment in the pneumatic spring bellows region Z. Within this segment, the strain sensor is, in particular, in the form of a strip. The strain sensor can in this case be an integral component of the pneumatic spring bellows 12 or be installed as additional component on or especially in the pneumatic spring bellows. When the strain sensor is used as additional component, exchangeability would also be able to be achieved.

LIST OF REFERENCE SYMBOLS (Part of the Description)

| | |
|---|---|
| 1 | Sensor arrangement |
| 2 | Strain sensor |
| 3 | Fixed resistance |
| 4 | Analog/digital converter |
| 5 | Microcontroller with memory |
| 6 | Radio interface |
| 7 | Controlled current/potential source |
| 8 | Energy supply (rectifiers and energy store) |
| 9 | Coupling coil |
| 10 | Receiver (radio antenna) |
| 11 | Pneumatic spring arrangement |
| 12 | Pneumatic spring bellows |
| 13 | Lid |
| 14 | Rolling piston |
| 15 | Volume-elastic air chamber |
| X | Loading cycles |
| Y | Resistance |
| Z | Pneumatic spring bellows region with strain sensor |

The invention claimed is:

1. A sensor as an integrated component of an article, in particular an elastic article, where the sensor comprises a polymeric material,
   wherein the polymeric material is provided with electrically conductive additives and acts as a strain sensor (2) by measuring static and dynamic strain in the article in relation to the forces acting on the article and in addition monitoring the changes in the polymeric material over time resulting from the static and dynamic strain in the article; and
   wherein filler-filler interactions are reduced by strain as a function of the dynamic stress (amplitude, frequency, time) and only partly recombine after interruption of the mechanical stress; said polymeric material therefore acts as a strain-dependent (variable) resistance; change in the polymeric material is monitored over the number of loading cycles as a result of the only partial recombination of the filler-filler interaction; in addition, relaxation time after mechanical deformation has been stopped is greatly dependent on the preceding deformation amplitude; and a combination of these two effects creates a strain sensor which measures the mechanical stress and aging state of polymers; and wherein if the electrically conductive additives have a conductivity in the range from $10^2$ to $10^6$ S/cm, then the electrically conductive additives are present in an amount of from 3 to 30 phr (parts per hundred of rubber), and wherein if the electrically conductive additives have a conductivity in the range from $10^{-1}$ to $10^2$ S/cm, then the electrically conductive additives are present in an amount of from 25 to 80 phr.

2. The sensor as claimed in claim 1, wherein the polymeric material is an elastomeric material based on a vulcanized rubber mixture which comprises an unblended rubber component or a rubber component blend, electrically conductive additives and customary mixture ingredients.

3. The sensor as claimed in claim 2, wherein the rubber component is an ethylene-propylene copolymer (EPM), an ethylene-propylene-diene copolymer (EPDM), nitrile rubber (NBR), (partially) hydrogenated nitrile rubber (HNBR), fluoro rubber (FR), chloroprene rubber (CR), natural rubber (NR), styrene-butadiene rubber (SBR), isoprene rubber (IR), butyl rubber (IIR), bromobutyl rubber (BIIR), chlorobutyl rubber (CIIR), butadiene rubber (BR), chlorinated polyethylene (CM), chlorosulfonated polyethylene (CSM), polyepichlorohydrin (ECO), ethylene-vinyl acetate rubber (EVA), acrylate rubber (ACM), silicone rubber (MVQ), fluorinated methylsilicone rubber (MFQ), perfluorinated propylene rubber (FFPM), perfluorocarbon rubber (FFCR) or polyurethane (PU), optionally with use of a blend, in particular in combination with one of the abovementioned types of rubber.

4. The sensor as claimed in claim 3, wherein the rubber component is EPM, EPDM, HNBR, CR, NR or FR, which are, in particular, in each case employed in unblended form.

5. The sensor as claimed in claim 3, wherein a blend of NR and BR is employed.

6. The sensor as claimed in claim 1, wherein the polymeric material is a thermoplastic elastomer (TPE) which is provided with the electrically conductive additives and comprises customary mixture ingredients.

7. The sensor as claimed in claim 6, wherein thermoplastic elastomers (TPE) based on styrene (TPE-S), and crosslinked or partially crosslinked olefin-based thermoplastic elastomers (TPE-O) or fully crosslinked olefin-based thermoplastic elastomers (TPE-V) are employed.

8. The sensor as claimed in claim 7, wherein the thermoplastic elastomer (TPE) is a blend of a thermoplastic polymer and at least a partially crosslinked rubber.

9. The sensor as claimed in claim 6, wherein the electrically conductive additives are present in an amount of from 0.5 to 20% by weight.

10. The sensor as claimed in claim 9, wherein the electrically conductive additives are present in an amount of from 1 to 15% by weight.

11. The sensor as claimed in claim 9, wherein the electrically conductive additives are present in an amount of from 1 to 10% by weight.

12. The sensor as claimed in claim 9, wherein the electrically conductive additives are present in an amount of from 1 to 3% by weight.

13. The sensor as claimed in claim 1, wherein the polymeric material is a polymer provided with the electrically conductive additives.

14. The sensor as claimed in claim 13, wherein the polymeric material comprises a fluorine-containing polymer.

15. The sensor as claimed in claim 14, wherein the fluorine-containing polymer is polytetrafluoroethylene (PTFE), polyvinyl fluoride (PVF), polyvinylidene fluoride (PVDF) or a chemical modification thereof.

16. The sensor as claimed in claim 1, wherein the electrically conductive additives are uniformly distributed within the polymeric material.

17. The sensor as claimed in claim 1, wherein the electrically conductive additives are metals and/or metal compounds and/or carbon black and/or carbon fibers and/or graphite and/or nanotubes and/or ionic liquids.

18. The sensor as claimed in claim 17, wherein the metals are present as metal powder and/or metal fibers.

19. The sensor as claimed in claim 17, wherein the electrically conductive additives are carbon black and/or carbon fibers.

20. The sensor as claimed in claim 17, wherein the carbon black is a conductive carbon black and/or standard carbon black.

21. The sensor as claimed in claim 17, wherein when carbon fibers are used, the fiber length is from 50 to 150 µm.

22. The sensor as claimed in claim 17, wherein when carbon fibers or metal fibers are used in the form of short fibers, the fiber length is from 3 to 6 mm.

23. The sensor as claimed in claim 17, wherein the nanotubes comprise carbon.

24. The sensor as claimed in claim 17, wherein when metals are used, a metallic reinforcing material embedded in a woven fabric is employed.

25. The sensor as claimed in claim 1, wherein the electrically conductive additives are a polymer, a polymer blend or a polymer mixture having electrically conductive functional groups.

26. The sensor as claimed in claim 25, wherein the functional groups are carbonyl groups.

27. The sensor as claimed in claim 26, wherein the functional groups are ester groups.

28. The sensor as claimed in claim 27, wherein a polyethylene glycol ester and/or a polyethylene glycol carboxylic ester is/are employed.

29. The sensor as claimed in claim 1, wherein the electrically conductive additives are coated with a low molecular weight compound.

30. The sensor as claimed in claim 29, wherein the electrically conductive additives are coated with a wax and/or a fat and/or an oil and/or with stearic acid and/or an aging inhibitor and/or a short-chain polymer.

31. The sensor as claimed in claim 1, wherein the total polymeric material of the article is provided with electrically conductive additives.

32. The sensor as claimed in claim 1, wherein the polymeric material of the article is provided with electrically conductive additives in at least one segment.

33. The sensor as claimed in claim 32, wherein the strain sensor (2) is in the form of a strip within a segment.

34. The sensor as claimed in claim 32, wherein the strain sensor (2) is an integral component of the article.

35. The sensor as claimed in claim 32, wherein the strain sensor (2) is installed as additional component on or in the article.

36. The sensor as claimed in claim 35, wherein the strain sensor (2) is exchangeable.

37. The sensor as claimed in claim 32, wherein the strain sensor (2) is present in the form of a series arrangement.

38. The sensor as claimed in claim 1, wherein the strain sensor (2) is combined with a comparative sensor.

39. The sensor as claimed in claim 1, wherein the strain sensor (2) is a component of a container material.

40. A sensor arrangement, wherein the sensor arrangement (1) comprises a strain sensor (2) as claimed in claim 1.

41. The sensor arrangement as claimed in claim 40, wherein the strain sensor (2) together with a microcontroller (5) forms a total sensor.

42. The sensor arrangement as claimed in claim 41, wherein the microcontroller (5) is provided with a memory.

43. The sensor arrangement as claimed in claim 40, wherein the sensor arrangement (1) is provided with a fixed resistance (3).

44. The sensor arrangement as claimed in claim 40, wherein the sensor arrangement (1) is provided with an analog/digital converter (4).

45. The sensor arrangement as claimed in claim 40, wherein the sensor arrangement (1) has a radio interface (6).

46. The sensor arrangement as claimed in claim 40, wherein the sensor arrangement (1) is provided with a current/potential source (7).

47. The sensor arrangement as claimed in claim 46, wherein the current/potential source (7) is controlled.

48. The sensor arrangement as claimed in claim 40, wherein the sensor arrangement (1) is provided with an energy supply (8).

49. The sensor arrangement as claimed in claim 48, wherein the energy supply (8) comprises a rectifier and an energy store.

50. The sensor arrangement as claimed in claim 48, wherein the energy supply (8) is effected electrically, via field coupling or by means of a dedicated piezoelectric generator unit.

51. The sensor arrangement as claimed in claim 40, wherein the sensor arrangement (1) is provided with a coupling coil (9).

52. The sensor arrangement as claimed in claim 51, wherein the coupling coil (9) operates at typical ISM frequencies.

53. The sensor arrangement as claimed in claim 40, wherein the sensor arrangement (1) is provided with a receiver (10).

54. The sensor arrangement as claimed in claim 53, wherein the receiver (10) is a radio antenna.

55. The sensor arrangement as claimed in claim 40, wherein the sensor arrangement (1) is provided with a data processing unit.

56. A sensor as an integrated component of an article, in particular an elastic article, where the sensor comprises a polymeric material,
wherein the polymeric material is provided with electrically conductive additives and acts as strain sensor (2) by measuring static and dynamic strain in the article in relation to the forces acting on the article and in addition monitoring the changes in the polymeric material over time resulting from the static and dynamic strain on the article;
said sensor further comprising a rubber mixture based on 100 phr of sulfur-modified chloroprene rubber containing conductive additives in a total amount of 30 phr, comprising
25 phr of conductive carbon black; BET surface area greater than 120 m$^2$/g; DBP adsorption greater than 90 cm$^3$/100 g) and
5 phr of carbon fibers having a fiber length of from 50 to 150 μm or in the form of short fibers having a fiber length of from 3 to 6 mm;
this rubber mixture being crosslinked to give a vulcanizate having a hardness of 65 Shore A (in accordance with DIN 53505) and an elongation at break of 750% (in accordance with DIN 53504), and an electrical volume resistance in accordance with DIN IEC 93 of 13 Ω.

57. A sensor as an integrated component of an article, in particular an elastic article, where the sensor comprises a polymeric material,
wherein the polymeric material is provided with electrically conductive additives and acts as strain sensor (2) by measuring static and dynamic strain in the article in relation to the forces acting on the article and in addition monitoring the changes in the polymeric material over time resulting from the static and dynamic strain on the article;
said sensor further comprising a rubber mixture based on a blend of 40 phr of natural rubber and 60 phr of butadiene rubber containing 65 phr of a standard carbon black as conductive additive, comprising,
a carbon black having a CTAB surface area of 42 m$^2$/g and a DBP adsorption of 121 ml/100 g;
this rubber blend being crosslinked to give a vulcanizate having a hardness of 60 Shore A (in accordance with DIN 53505) and an elongation at break of 500% (in accordance with DIN 53504) and an electrical volume resistance in accordance with DIN IEC 93 of 1.2 kΩ.

58. A sensor as an integrated component of an article, in particular an elastic article, where the sensor comprises a polymeric material,
wherein the polymeric material is provided with electrically conductive additives and acts as strain sensor (2) by measuring static and dynamic strain in the article in relation to the forces acting on the article and in addition monitoring the changes in the polymeric material over time resulting from the static and dynamic strain on the article;
said sensor further comprising a rubber mixture based on 100 phr of natural rubber containing conductive additives in a total amount of 25 phr, comprising
15 phr of conductive carbon black; BET surface area greater than 120 m$^2$/g; DBP adsorption greater than 90 cm$^3$/100 g) and
10 phr of nanotubes;
this rubber being crosslinked to give a vulcanizate having a hardness of 67 Shore A (in accordance with DIN 53505) and an elongation at break of 400% (in accordance with DIN 53504), and an electrical volume resistance in accordance with DIN IEC 93 of 3.6 Ω.

\* \* \* \* \*